Jan. 1, 1929.
E. L. HARRY
BRAKE
Filed July 23, 1927
1,696,951
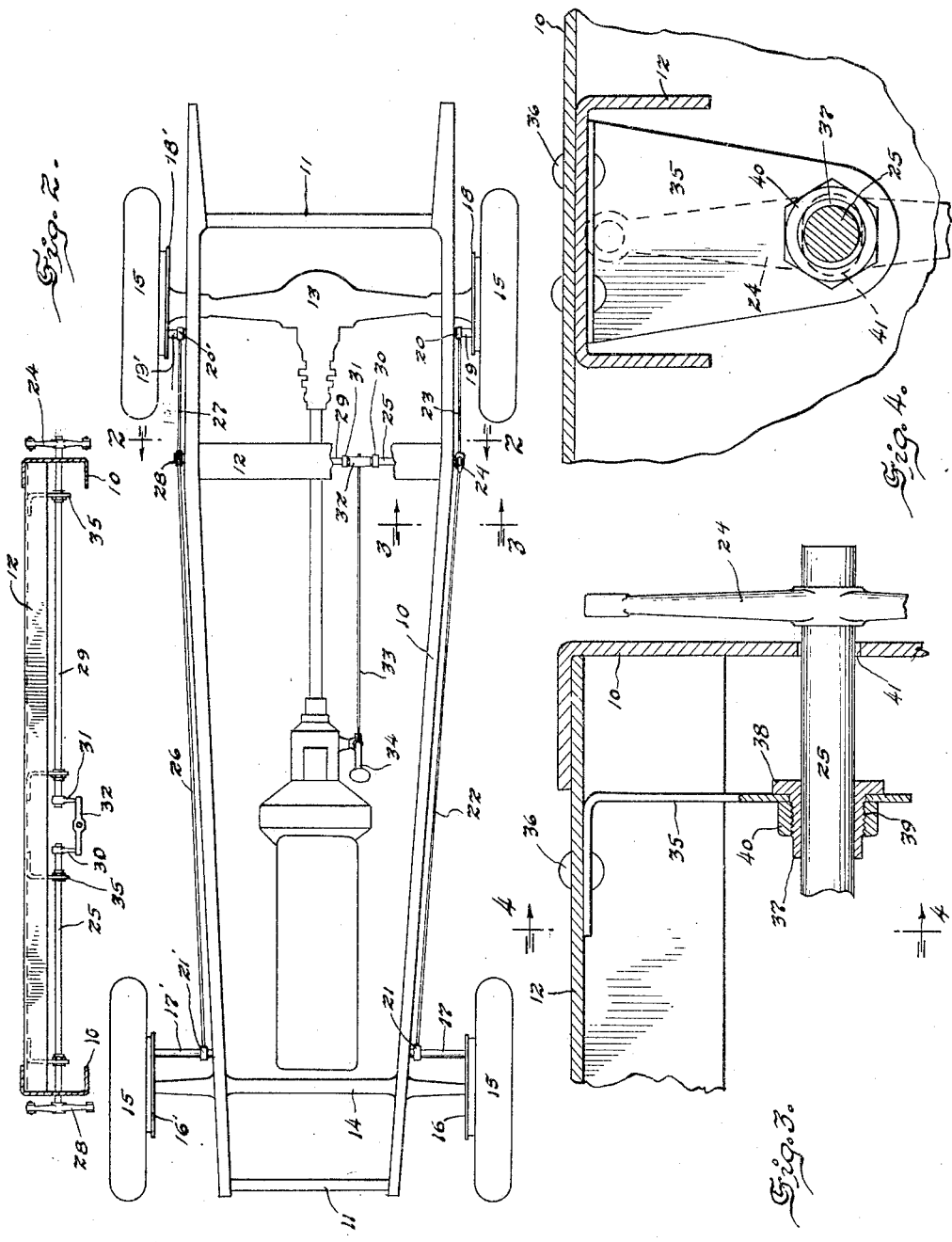
INVENTOR
Earl L. Harry
BY
ATTORNEY Patented Jan. 1, 1929.

1,696,951

UNITED STATES PATENT OFFICE.

EARL L. HARRY, OF SOUTH BEND, INDIANA, ASSIGNOR TO THE STUDEBAKER CORPORATION, OF SOUTH BEND, INDIANA, A CORPORATION OF NEW JERSEY.

BRAKE.

Application filed July 23, 1927. Serial No. 207,964.

This invention relates to brake mechanism for motor vehicles and particularly for the rock-shafts which extend transversely of the vehicle frame, the principal object being to provide a vehicle brake mechanism with flexible supports for the brake rock-shafts to prevent binding of the same in their bearings.

Another object is to provide a vehicle brake mechanism with yieldable supports for the brake rock-shafts to allow free rotation of the same when they are subjected to bending stresses.

Another object is to provide a vehicle brake mechanism with thin sectioned sheet metal supports for the rock-shafts which, when the rock-shafts are subjected to bending stresses, will flex to allow free rotation of the same.

A further object is to provide a brake rock-shaft with yieldable supports each of which comprises a thin sectioned sheet metal stamping secured to the vehicle frame, a shaft journal extending therethrough and a nut threaded on the journal for securing the same to the stamping.

These being among the objects of the present invention, the same consists of certain features of construction and combinations of parts to be hereinafter described with reference to the accompanying drawing and then claimed, having the above and other objects in view.

In the accompanying drawing which illustrates a suitable embodiment of the present invention, Figure 1 is a plan view of a motor vehicle chassis showing the brake hook-up for the front and rear wheel brakes.

Figure 2 is an enlarged transverse section of the chassis taken on the line 2—2 of Figure 1.

Figure 3 is an enlarged section taken on the line 3—3 of Figure 1 showing one of the brake rock-shaft supports.

Figure 4 is a section taken on the line 4—4 of Figure 3.

Referring to the accompanying drawing in which like numerals refer to like parts throughout the several views, the vehicle frame comprises longitudinal side rails 10, front and rear cross members 11 and an intermediate cross member 12. The frame side rails 10 are supported in a conventional manner upon a rear axle 13 and a front axle 14, each having road wheels 15. The front wheels are swiveled to the ends of the front axle 14 and are provided with suitable brakes 16 and 16' operated by means of rotatable shafts 17 and 17' having operating levers 21 and 21' respectively mounted thereon. Similarly the rear wheels are rotatably secured to the ends of the rear axle 13 and are provided with brakes 18 and 18' operated by means of shafts 19 and 19' having operating levers 20 and 20' respectively mounted thereon.

The brakes 16 and 18 on the left side of the vehicle are connected to the rods 22 and 23 by the operating levers 21 and 20 for simultaneous operation by double lever 24 connected to the ends of the levers 21 and 20. The lever 24 is secured to one end of a rock-shaft 25 projecting through an opening 41 in the frame side rail 10.

The brakes 16' and 18' are connected to the rods 26 and 27 by the operating levers 21' and 20' for simultaneous operation by a double lever 28 connected to the ends of the levers 21' and 20'. The lever 28 is secured to an end of a rock-shaft 29 extending through an opening in the side rail 10 at the right side of the vehicle frame. Secured to the adjacent ends of the rock-shafts 25 and 29 are levers 30 and 31, which are pivoted at their ends to the opposite ends of an equalizing bar 32 which is connected by a rod 33 to a conventional brake foot pedal 34. Pressure produced by depressing the foot pedal 34 is equally distributed through the equalizing bar 32 to the rock-shafts 25 and 29. Each rock-shaft then distributes the pressure to its respective set of front and rear brakes.

The rock-shafts 25 and 29 are each provided with supports near their ends. As shown in Figure 3, these supports consist principally of a thin sectioned stamping 35 of flat spring steel, flanged over and secured to the frame cross member 12 by rivets 36 so that it extends downwardly, perpendicular to the cross member 12 and so that the flat surface thereof lies substantially parallel with the longitudinal side rails 10. A bushing 37 having a flanged head 38 and a threaded outer cylindrical portion 39 extends through an opening in the extreme lower end of the stamping 35 and is held therein by a nut 40 threaded on the outer cylindrical portion 39 so that when it is tightened, it bears against one surface of the stamping 35 and draws the flanged head 38 of the bushing 37 against the opposite face of the stamping 35. The rock-shafts 25 and 29 are each supported near their ends by two of these supports and are rotatably journaled in the bushings 37.

In constructions used heretofore, the supports for the rock-shafts have always been rigid and when braking pressure was applied thereto through the equalized bar, certain stresses were set up which had a tendency to bend the rock-shafts between their supports. This bending consequently caused the rock-shafts to tend to extend through the bushings at an angle to the center lines thereof which produced considerable friction at diagonally opposite portions of the bushings. In other words, the rock-shafts would bind in the bushings and considerably more pressure would have to be applied to rotate the same. The increased friction produced at the diagonally opposite portions of the bushings also caused the bushings to wear unevenly and more rapidly.

In the present invention, this serious disadvantage has been entirely eliminated by providing the rock-shafts with yieldable supports. When the rock-shaft 25 is rotated it has the same tendency to bend as previously described, but because of the stampings 35 are of flexible spring steel, the shaft bushings 37 assume the same position as the rock-shaft 25 upon flexing movement of the stampings 35. That is, the center lines of the bushings 37 and the shaft 25 substantially coincide. It can be seen that the shaft 25 is free to rotate in the bushings 37 because of the flexing of the support stampings 35 caused by the bending of the shaft 25. It can also be seen that the bushings 37 will wear more evenly and will last longer when they are allowed to follow the bending of the shaft 25.

Formal changes may be made in the specific embodiment of the invention described without departing from the spirit and substance of the broad invention, the scope of which is commensurate with the appended claims.

What I claim is:

1. In a vehicle having brakes and a rock-shaft for applying said brakes, a support for said rock-shaft intermediate the ends of said shaft comprising a flexible metallic member having a broad face thereof perpendicular to the axis of said shaft and a bushing secured to said member, said metallic member being capable of flexing upon bending of said rock-shaft to allow free rotation of said rock-shaft in said bushing.

2. In a vehicle having brakes and a rock-shaft for applying said brakes, a support for said rock-shaft intermediate the ends thereof comprising a flexible sheet metal stamping, a bushing projecting through said stamping for receiving an end of said rock-shaft, and means for securing said bushing to said stamping, bending movement of said rock-shaft flexing said stamping to allow free rotation of said rock-shaft in said bushing.

3. In a vehicle having brakes and a rock-shaft for applying said brakes, a support for said rock-shaft intermediate the ends thereof comprising a flexible sheet metal bracket secured to the frame of said vehicle, a bushing projecting through said bracket having a head seating against one side of said bracket and having a threaded cylindrical outer portion adjacent the other side of said bracket, and a nut received by said threaded portion for securing said bushing to said bracket, bending movement of said rock-shaft flexing said bracket to allow free rotation of said rock-shaft in said bushing.

4. In a vehicle having front and rear wheels provided with individual brakes and means directly connecting said front and rear brakes on the same side of said vehicle, rock-shafts for each of said means adapted to be operated simultaneously flexible brackets secured to the frame of said vehicle, and bushings secured to said brackets for receiving said rock-shafts intermediate the ends thereof, said brackets being adapted to flex upon bending of said rock-shafts to allow free rotation of said rock-shafts in said bushing.

5. In a vehicle having front and rear wheels provided with individual brakes and means directly connecting said front and rear brakes on the same side of said vehicle, rock-shafts for each of said means provided with an operating member between the adjacent ends thereof, flat flexible sheet metal brackets secured to and depending from the frame of said vehicle, bushings for said rock-shafts, and members threaded on said bushings for securing said bushings to said brackets, said brackets being adapted to be flexed upon bending of said rock-shafts extending therethrough to allow free rotation of said rock-shafts in said bushings.

6. In a vehicle having a frame, a frame cross member, front and rear wheels provided with individual brakes, and means directly connecting said brakes on the same side of said vehicle, rock-shafts projecting through openings in said frame for each of said means and provided with an operating member between the adjacent ends thereof, flat flexible sheet metal brackets secured to and depending from said frame cross member, bushings for said brackets, and nuts threaded thereon for securing said bushings to said brackets, said brackets being adapted to be flexed by the bending of said rock-shafts to allow free rotation of said rock-shafts in said bushings.

Signed by me at South Bend, Indiana, this 21st day of July 1927.

EARL L. HARRY.